United States Patent
Majumder

(10) Patent No.: US 7,206,793 B2
(45) Date of Patent: Apr. 17, 2007

(54) GENERALIZED FILE MATCHING METHOD AND SYSTEM

(75) Inventor: Partha Sarathi Majumder, Palatine, IL (US)

(73) Assignee: SBC Properties L.P., Reno, NV (US)

( * ) Notice: Subject to any disclaimer, the term of this patent is extended or adjusted under 35 U.S.C. 154(b) by 508 days.

(21) Appl. No.: 10/154,446

(22) Filed: May 22, 2002

(65) Prior Publication Data
US 2003/0220942 A1 Nov. 27, 2003

(51) Int. Cl.
*G06F 17/30* (2006.01)
(52) U.S. Cl. .......................... 707/200; 707/7
(58) Field of Classification Search .............. 707/1, 707/2, 6, 200, 10, 201, 202, 203, 205, 7, 707/204
See application file for complete search history.

(56) References Cited

U.S. PATENT DOCUMENTS

| | | | |
|---|---|---|---|
| 5,283,895 A * | 2/1994 | Kashio | 707/200 |
| 5,630,116 A * | 5/1997 | Takaya et al. | 707/201 |
| 5,764,977 A * | 6/1998 | Oulid-Aissa et al. | 707/10 |
| 5,781,908 A * | 7/1998 | Williams et al. | 709/223 |
| 6,058,375 A * | 5/2000 | Park | 705/30 |
| 6,446,090 B1 * | 9/2002 | Hart | 707/201 |
| 6,463,439 B1 * | 10/2002 | Dahlberg | 707/100 |
| 6,477,521 B1 * | 11/2002 | Kumomura et al. | 707/1 |
| 2002/0052887 A1* | 5/2002 | Mori | 707/201 |

OTHER PUBLICATIONS

Okubo et al., An Optimistic Method for Updating Information in Distributed Collaborative Work, Computer Software and Applications Conference, 1998. COMPSAC '98. Proceddings. The Twenty-Second Annual International, Aug. 19-21, 1998, pp. 400-405.*

* cited by examiner

*Primary Examiner*—Greta Robinson
(74) *Attorney, Agent, or Firm*—Brinks Hofer Gilson & Lione

(57) ABSTRACT

A master file is updated based on a plurality of transaction files by reading the master file exactly once. A record and its associated key value are read from each of the files. A current key value is set to an optimum of the last-read key values for all of the files. A record in the updated master file is based on the last-read record from each of the files whose last-read key value equals the current key value. A record and its associated key are attempted to be read from each of the files whose last-read key value equals the current key value. For each file being read, the last-read key value is updated, and the above acts are repeated.

15 Claims, 4 Drawing Sheets

```
INITIAL PROCESSING:                    ⟋52
    LOOP FOR J = 1 TO N ⟋           ⟋54
        READ RECORD FROM FILEJ ⟋
        IF END-OF-FILE
            ASSIGN HIGH VALUE TO KEYJ
        ELSE
            ASSIGN KEY VALUE OF RECORD READ TO KEYJ
        END IF
        ASSIGN 0 TO MATCHKEYJ ⟋62
    END LOOP
    ASSIGN LOW VALUE TO CURRENT KEY ⟋64

MAIN PROCESSING:                       ⟋70
    DO WHILE CURRENT KEY < HIGH VALUE ⟋
        CURRENT KEY = MIN(KEY1, KEY2, ..., KEYN) ⟋72
        IF CURRENT KEY = HIGH VALUE            ⟋74
            PERFORM END-OF-PROCESSING
        END IF           ⟋76
        LOOP FOR J = 1 TO N ⟋
        /* ASSIGN 1 IF CURRENT KEY = MATCHKEYJ, ELSE ASSIGN 0
            IF KEYJ = CURRENT KEY
                ASSIGN 1 TO MATCHKEYJ           ⟋80
            ELSE
                ASSIGN 0 TO MATCHKEYJ
            END IF   ⟋81
        END LOOP
        /*DETERMINE PARAGRAPH TO PROCESS
        CALCULATE PARAGRAPH NO = MATCHKEY1 * 1 + MATCHKEY2 * 2 + ...
                                 + MATCHKEYN*2^{N-1}
        PERFORM PROCESS PARAGRAPH(CALCULATE PARAGRAPH NO)
        LOOP FOR J = 1 TO N ⟋100
            IF MATCHKEYJ = 1
                READ RECORD FROM FILEJ ⟋104
                IF END-OF-FILE
                    ASSIGN HIGH VALUE TO KEYJ ⟋110
                ELSE
                    ASSIGN KEY VALUE OF RECORD READ TO KEYJ
                END IF
            END IF
        END LOOP
    END WHILE
```

FIG. 3

PROCESS PARAGRAPH 1: ⸺86
/* THIS PARAGRAPH IS PERFORMED IF CURRENT KEY IS MATCHING ONLY WITH
KEY1, I.E. WHEN CALCULATE PARAGRAPH NO = $1*2^0+0*2^1+...+0*2^{N-1} = 1$
    PERFORM LOGIC WHERE MATCH FOR FILE1

PROCESS PARAGRAPH 2: ⸺90
/* THIS PARAGRAPH IS PERFORMED IF CURRENT KEY IS MATCHING ONLY WITH
KEY2, I.E. WHEN CALCULATE PARAGRAPH NO = $0*2^0+1*2^1+...+0*2^{N-1} = 2$
    PERFORM LOGIC WHERE MATCH FOR FILE2

PROCESS PARAGRAPH 3: ⸺92
/* THIS PARAGRAPH IS PERFORMED IF CURRENT KEY IS MATCHING ONLY WITH KEY1
AND KEY2, I.E. WHEN CALCULATE PARAGRAPH NO = $1*2^0+1*2^1+...+0*2^{N-1} = 3$
    PERFORM LOGIC WHERE MATCH FOR FILE1 AND FILE2

PROCESS PARAGRAPH $2^N$-1: ⸺94
/* THIS PARAGRAPH IS PERFORMED IF CURRENT KEY IS MATCHING ALL KEYS, I.E.
WHEN CALCULATE PARAGRAPH NO = $1*2^0+1*2^1+...+1*2^{N-1} = 2^N-1$
    PERFORM LOGIC WHERE MATCH FOR ALL FILES: FILE1, FILE2, ..., FILEN

END-OF-PROCESSING: ⸺75
    CLOSE ALL FILES, NAMELY FILE1, FILE2, ..., FILEN
    WRITE ALL CONTROLS

FIG. 4

GENERALIZED FILE MATCHING METHOD AND SYSTEM

BACKGROUND OF THE INVENTION

1. Field of the Invention

The present invention relates to computer file matching and updating.

2. Description of the Related Art

In many applications, a master file is updated in a batch processing environment based on at least one transaction file. Each record in the master file and the transaction file(s) is identifiable by a key or a set of keys. The master file is updated by comparing the key or keys therein to those in the at least one transaction file.

Coding, debugging and maintaining computer software which compares the master files to two or more transaction files is difficult and complicated. One possible option is to break the logic into multiple modules where each module compares only one transaction file with the master file to create an updated master file. The process is continued to compare all transaction files with the master file. This approach is time consuming and input/output intensive because the master file is read and updated multiple times.

BRIEF DESCRIPTION OF THE DRAWINGS

The present invention is pointed out with particularity in the appended claims. However, other features are described in the following detailed description in conjunction with the accompanying drawings in which:

FIGS. 3 and 4 are a pseudo code representation of a method of generating an updated master file based on a master file and multiple transaction files.

DETAILED DESCRIPTION OF THE PREFERRED EMBODIMENTS

Disclosed herein are embodiments of a generalized file matching method and system which reads each of a master file and two or more transaction files only once to generate an updated master file. This saves input/output acts involved to read and update the master file. Since input/output acts are expensive in terms of processing time, an overall processing time is reduced. Further, the method can be implemented using computer program code which is amenable to coding, debugging and maintaining complex file matching in a systematic manner. Still further, the computer program code can be embodied within a single computer program.

Figure 1:
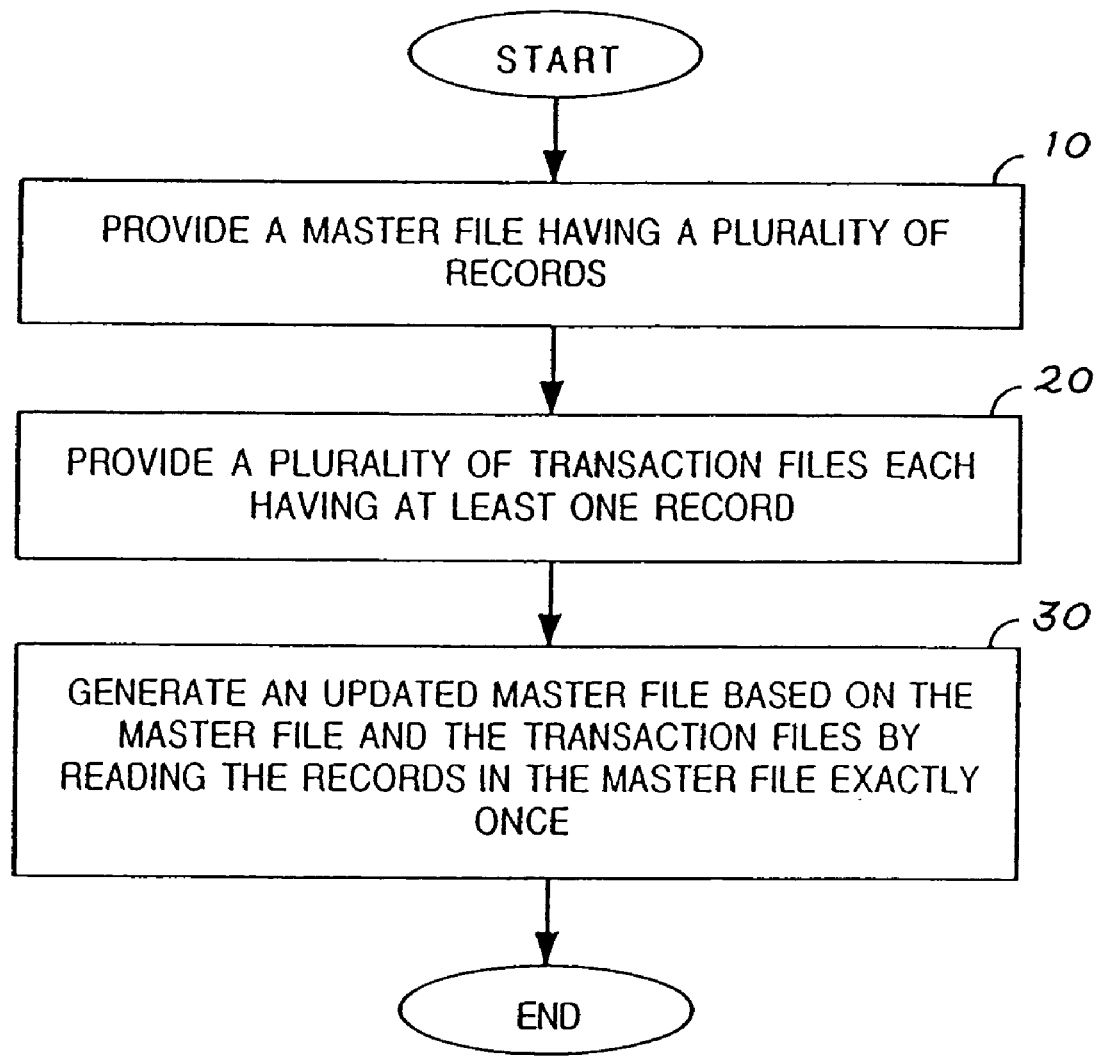
FIG. 1 is a flow chart of an embodiment of a file matching method.
Figure 2:
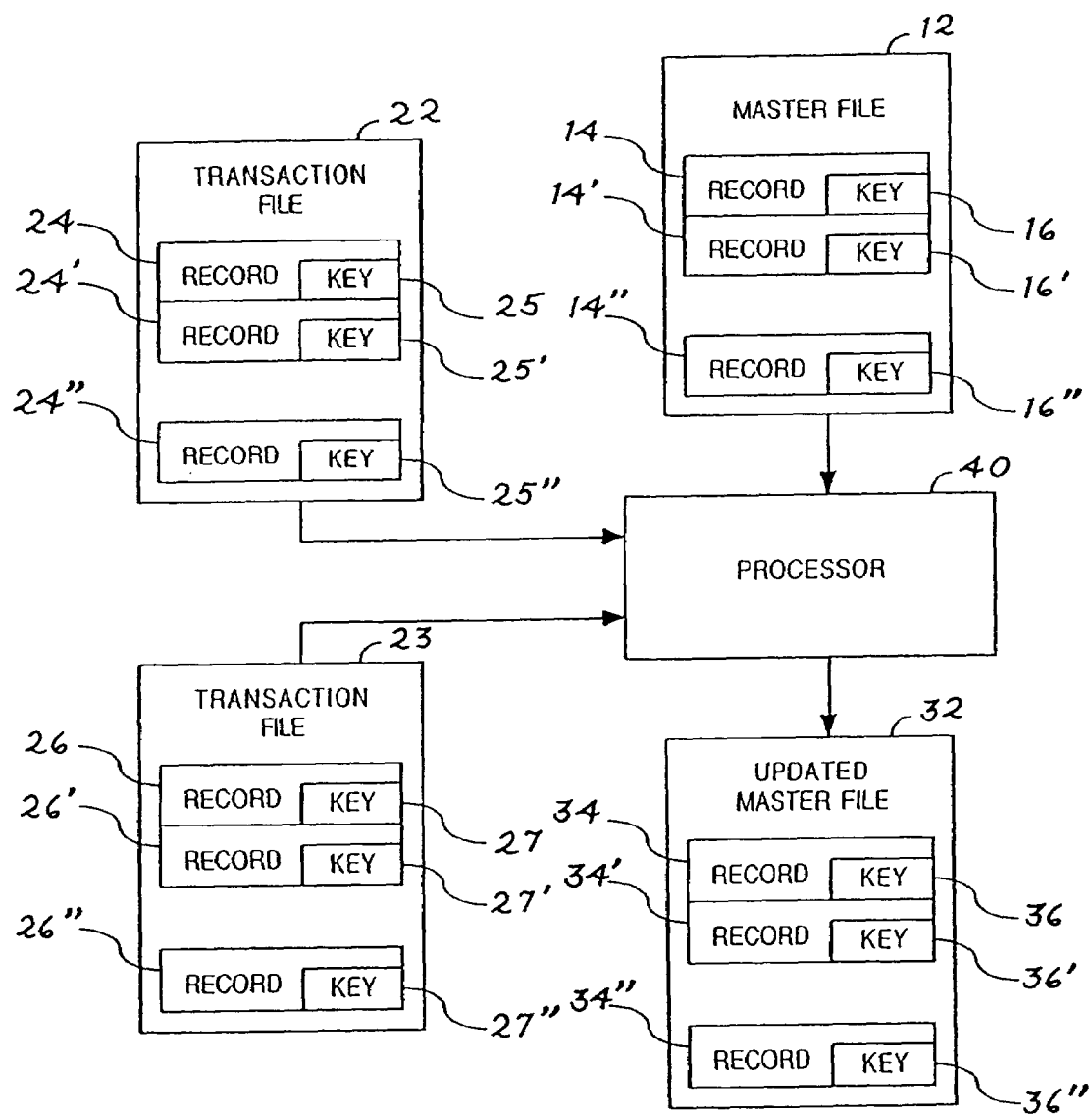
FIG. 2 is a block diagram of an embodiment of a file matching system.

Embodiments of the present invention are described with reference to FIG. 1, which is flow chart of an embodiment of a file matching method, and FIG. 2 which is a block diagram of an embodiment of a file matching system.

As indicated by block 10, the method comprises providing a master file 12 having a plurality of records 14, 14', and 14". Each of the records 14, 14', and 14" is identifiable by at least one key 16, 16' and 16". For simplicity in describing the present invention, a single key is illustrated to identify each of the records 14, 14' and 14", although those having ordinary skill in the art will appreciate that multiple keys may be employed.

As indicated by block 20, the method comprises providing a plurality of transaction files each having at least one record. For simplicity in describing the present invention, two transaction files 22 and 23 are illustrated, although those having ordinary skill in the art will appreciate that any number of transaction files may be used. The transaction file 22 has at least one record 24, 24' and 24", where each record 24, 24' and 24" is identifiable by at least one key 25, 25', and 25". The transaction file 23 has at least one record 26, 26' and 26", where each record 26, 26', and 26" is identifiable by at least one key 27, 27', and 27". As with the master file 12, a single key is illustrated to identify each of the records 24, 24' and 24", and 26, 26', and 26", in the transaction files 22 and 23, although those having ordinary skill in the art will appreciate that multiple keys may be employed.

The master file 12 and the transaction files 22 and 23 are stored by at least one computer-readable medium. Examples of the computer-readable medium include, but are not limited to, an electronic medium, a magnetic medium, an optical medium and a magneto-optical medium. Examples of an electronic medium include, but are not limited to, an electronic memory card. Examples of a magnetic medium include, but are not limited to, a magnetic disk such as a floppy disk or a hard disk, or a magnetic tape. Examples of an optical medium include, but are not limited to, an optical disk such as a CD or a DVD. The various files 12, 22 and 23 may be stored by the same medium or by different media. If stored by different media, the various files 12, 22 and 23 may be disposed at geographically diverse locations.

As indicated by block 30, the method comprises generating an updated master file 32 based on the master file 12 and the transaction files 22 and 23 by reading the records 14 in the master file 12 exactly once. Thus, the updated master file 32 is generated in a single pass through the master file 12. Further, the records 24 in the transaction file 22 and the records 26 in the transaction file 23 are read exactly once, as well, in a single pass therethrough.

The updated master file 32 is generated by determining sets of the key values 16, 25 and 27 which are matching. Records which correspond to a matching set of key values are processed to produce a record 34, 34', and 34" identifiable by at least one key 36, 36', and 36" corresponding the key value. After processing all of the records 14, 24 and 26, the updated master file 32 has a plurality of records each being uniquely identifiable by at least one key.

The updated master file 32 is generated by a processor 40. The processor 40 may be embodied within a programmed computer. The programmed computer provides functionality which may be implemented in hardware and/or software and/or firmware. The programmed computer includes a computer-readable medium encoded with executable instructions representing a computer program. The processor 40 is responsive to the computer-readable medium to perform a series of specifically identified operations dictated by the computer program. In this way, the computer program causes the computer to function in a particular fashion. Examples of the processor 40 include, but are not limited to, a general purpose microprocessor and an application specific integrated circuit.

FIGS. 3 and 4 are a pseudo code representation of a method of generating an updated master file based on a master file and multiple transaction files. The method acts in accordance with the following assumptions: (a) records in the master file 12 and the transaction files 22 and 23 are sorted with a common set of keys; (b) when an end-of-file condition occurs, a high value is assigned to the corresponding key of the file; and (c) files are named as File1, File2, File3, . . . , FileN, and their corresponding key variables are named as Key1, Key2, Key3, . . . , KeyN. The high value is greater than the greatest key value for any record in any of the files being processed. In this method, no distinction between the master file and the transaction files is necessary for labeling the files as File1, File2, File3, . . . , FileN. Thus, the method is applicable to any set of two or more files.

As indicated by reference numeral 50, the method comprises initial processing acts. A variable J is prepared to loop from 1 to N, as indicated by reference numeral 52. Based on the value of J, a record is attempted to be read from FileJ, as indicated by reference numeral 54. If an end-of-file condition occurs, the value KeyJ is assigned a high value (reference numeral 56). Otherwise, the value KeyJ is assigned the key value of the record read from FileJ (reference numeral 60). A value of a variable denoted as MatchKeyJ is assigned an initial value such as zero (reference numeral 62). As indicated by an end loop statement 63, the value of J is updated so that the above acts are performed for each of the files. A further initial processing act comprises assigning a low value to a value of a variable denoted as CurrentKey (reference numeral 64).

As indicated by reference numeral 66, the method comprises main processing acts. The main processing acts are performed while the CurrentKey value is less than the high value (reference numeral 70). As indicated by reference numeral 72, the CurrentKey value is assigned the minimum of the key values, i.e. min{Key1, Key2, Key3, . . . , KeyN}. As indicated by reference numeral 74, if the CurrentKey value is equal to the high value, then the main processing acts are terminated, and end-of-processing acts 75 are performed. Otherwise, the variable J is prepared to loop from 1 to N, as indicated by reference numeral 76. As indicated by reference numeral 80, if the value of KeyJ is equal to the value of CurrentKey, the MatchKeyJ value is assigned to be 1, otherwise the MatchKeyJ value is assigned to be 0. As indicated by an end loop statement 81, the above acts are performed for each J in the loop.

As indicated by reference numeral 82, a program code portion is determined based on the values of MatchKey1, MatchKey2, . . . , MatchKeyN. The program code portion may be identified by a paragraph number as described herein, or in an alternative manner. The paragraph number is calculated using the following equation, which performs a binary to decimal conversion.

$$\text{paragraph\_no} = \sum_{J=1}^{N} MatchKeyJ * 2^{J-1}$$

As indicated by reference numeral 84, the program code portion identified by the paragraph number is processed. For example, if MatchKey1 is 1, and the other MatchKey values are zero, a program code portion 86 identified by paragraph number 1 is processed. The program code portion 86 performs logic where there is a match for File1, i.e. the key value of the last-read record in File1 matches no other keys in the other files. If MatchKey2 is 1, and the other MatchKey values are zero, a program code portion 90 identified by paragraph number 2 is processed. The program code portion 90 performs logic where there is a match for File2, i.e. the key value of the last-read record in File2 matches no other keys in the other files. If MatchKey1 is 1, MatchKey2 is 1, and the other MatchKey values are zero, a program code portion 92 identified by paragraph number 3 is processed. The program code portion 92 performs logic where there is a match for File1 and File2, i.e. the key value of the last-read record in File1 matches the key value of the last-read record in File 2, but matches no other keys in the other files. If all of the MatchKey values are 1, a program code portion 94 identified by paragraph number $2^N-1$ is processed. The program code portion 94 performs logic where there is a match for all of the files, i.e. the key value of the last-read record in all of the files match each other. The specific logic performed in each program code portion is application dependent.

The variable J is prepared to loop from 1 to N, as indicated by reference numeral 100. As indicated by reference numeral 102, if the value of MatchKeyJ is equal to 1, then one or more file reading acts are performed for the FileJ. In particular, a record is attempted to be read from FileJ, as indicated by block 104. If an end-of-file condition occurs (reference numeral 106), a high value is assigned to KeyJ (reference numeral 110), otherwise the key value of the record is assigned to KeyJ (reference numeral 112). As indicated by an end loop statement 114, the value of J is updated to perform the above acts up to J=N. As indicated by an end while statement 116, flow of the method is directed to reference numeral 72 to determine a new CurrentKey value while the CurrentKey value is less than the high value.

When the CurrentKey value attains the high value, the end-of-processing acts 75 are performed. The end-of-processing acts comprise closing all of the files (File1, File2, . . . , FileN), and writing all controls.

The herein-disclosed generalized matching algorithm can be used in a wide variety of applications. For example, telecommunications service providers may use the algorithm in billing solutions to process millions of transactions during daily batch processing cycles. Files for billing are processed from sources such as monthly recurring charges from a customer database, one-time credits and charges (OC&C), adjustments, payments, local usage and long distance charges. Other applications include, but are not limited to, banking applications and travel applications.

An embodiment of the file matching algorithm is illustrated for employee files comprising an employee master file and an employee transaction file. The employee master file is compared and matched with the employee transaction file, where the comparison key is an employee identifier, herein denoted by "employee-ID". Both files are sorted in ascending order by employee-ID. At any given time, one record from each file is stored in a work area.

When the key values (values of employee-ID) are compared, there are three possible outcomes: (1) employee-ID of the master file<employee-ID of the transaction file, (2) employee-ID of the master file=employee-ID of the transaction file, and (3) employee-ID of the master file>employee-ID of the transaction file. In outcome (1), there exists a record in the master file with no corresponding record in the transaction file (i.e. the smaller key value of the two records matches only to that of the master file). In outcome (2), there exists a record in the master file with a corresponding record in the transaction file (i.e. the smaller key value matches to both key values of the master file and the transaction file). In outcome (3), there exists no matching record in the master file whereas a record exists in the transaction file (i.e. the smaller key value of the two records matches only to that of the transaction file).

Thus, the three possible outcomes can be represented as follows: (1) smaller key value=key value of master file and smaller key value>key value of transaction file, (2) smaller key value=key value of master file and smaller key value=key value of transaction file, and (3) smaller key value>key value of master file and smaller key value=key value of transaction file.

When the key values are compared for three files (File1, File2, and File3) which are sorted in ascending order by the common key, the possible outcomes are as follows: (1) SKV=KV of File1, SKV>KV of File2, SKV>KV of File3; (2) SKV=KV of File1, SKV=KV of File2, SKV>KV of File3; (3) SKV=KV of File1, SKV=KV of File2, SKV=KV of File3; (4) SKV>KV of File1, SKV=KV of File2, SKV>KV of File3; (5) SKV>KV of File1, SKV=KV of File2, SKV=KV of File3; (6) SKV>KV of File1, SKV>KV of File2, SKV=KV of File3; and (7) SKV=KV of File1, SKV>KV of File2, SKV=KV of File3; where SKV denotes the smallest key value of three current records from the three files and KV denotes a key value from a particular record.

If two files are compared, there are $2^2-1=3$ possible outcomes. If three files are compared, there are $2^3-1=7$ possible outcomes. If four files are compared, there are $2^4-1=15$ possible outcomes. If N files are compared, there are $2^N-1$ possible outcomes.

It will be apparent to those skilled in the art that the disclosed inventions may be modified in numerous ways and may assume many embodiments other than the preferred forms specifically set out and described herein. For example, the key values can be placed in descending order rather than in ascending order. In this case, the current key value is set to a maximum of the last-read key values rather than a minimum thereof. Further in this case, a low value is assigned as the last-read key value for an end-of-file condition, the main processing acts are performed while the current key value is greater than the low value, and end-of-processing acts are performed if the current key is equal to the low value. The low value is selected to be less than the smallest key value for any record in any of the files being processed. Thus, in general, the current key is assigned to be an optimum value of the last-read key values Key1, Key2, ..., KeyN.

Further, an alternative binary representation may be used to identify a specific program code portion. In general, a specific program code portion is numerically identified using a series of bits, each bit being associated with one of the files. A bit has a first predetermined value if the current key value is equal to the last-read key value of the associated file, and a second predetermined value if the current key value is not equal to the last-read key value of the associated file. The first and second predetermined values may be one and zero, respectively, as described with reference to FIGS. 3 and 4. Alternatively, the first and second predetermined values may be zero and one, respectively.

Accordingly, it is intended by the appended claims to cover all modifications which fall within the true spirit and scope of the present invention.

What is claimed is:

1. A computer-implemented method for generating an updated master file, the method comprising:
   reading a plurality of records of a master file exactly once and reading a plurality of transaction files to generate an updated master file;
   wherein each record of the plurality of records of the master file is identified by at least one key;
   wherein each transaction file of the plurality of transaction files comprise at least one record, each record identifiable by at least one key;
   wherein the records in the master file and each of the transaction files are sorted by its at least one key; and
   wherein generating the updated master file comprises the steps of:
   (a) reading a record and its associated key value from the master file and each of the plurality of transaction files;
   (b) storing a last-read key value for the master file and each of the plurality of transaction files based on said reading in step (a);
   (c) determining a current key value as an optimum of the last-key values for all of the master file and plurality of transaction files;
   (d) determining which of the master file and the plurality of transaction files has a last-read key value equal to the current key value;
   (e) processing the last-read record from each of the master file and the plurality of transaction files whose last-read record from each of the master file and the plurality of transaction files whose last-read key value equals the current key value to generate a record in the updated master file;
   (f) reading a record and its associated key, or an end-of-file indication, from each of the master file and the plurality of transaction files whose last-read key value equals the current key value;
   (g) updating the last-read key value for each of the master file and the plurality of transaction files based on said reading in step (f); and
   (h) repeating steps (c) through (g) at least once.

2. The method of claim 1 wherein said step (h) comprises repeating steps (c) through (g) until all records have been read from all of the master file and the plurality of transaction files.

3. The method of claim 1 wherein said step (e) of processing is performed by a specific program code portion, the method further comprising determining the specific program code portion based on which of the master file and the plurality of transaction files has a last-read key value equal to the current key value.

4. The method of claim 3 wherein the specific program code portion is numerically identified using a series of bits, each bit associated with one of the master file and the plurality of transaction files, each bit having a first predetermined value if the current key value is equal to the last-read key value of the associated file, and a second predetermined value if the current key value is not equal to the last-read key value of the associated file.

5. The method of claim 4 wherein the first predetermined value is one and the second predetermined value is zero.

6. An apparatus for generating an updated master file, the apparatus, comprising:
   a processor to process a master file having a plurality of records each identifiable by at least one key and a plurality of transaction files having at least one record each identifiable by at least one key to generate an updated master file by reading the records in the master file exactly once;
   wherein the records in the master file and each of the transaction files are sorted by its at least one key, wherein the processor is to generate the updated master file by performing the steps of;
   (a) reading a record and its associated key value from the master file and each of the plurality of transaction files;
   (b) storing a last-read key value for the master file and each of the plurality of transaction files based on said reading in step (a);
   (c) determining a current key value as an optimum of the last-key values for all of the master file and plurality of transaction files;

(d) determining which of the master file and the plurality of transaction files has a last-read key value equal to the current key value;

(e) processing the last-read record from each of the master file and the plurality of transaction files whose last-read record from each of the master file and the plurality of transaction files whose last-read key value equals the current key value to generate a record in the updated master file;

(f) reading a record and its associated key, or an end-of-file indication, from each of the master file and the plurality of transaction files whose last-read key value equals the current key value;

(g) updating the last-read key value for each of the master file and the plurality of transaction files based on said reading in step (f); and (h) repeating steps (c) through (g) at least once.

7. The apparatus of claim 6 wherein said step (h) comprises repeating steps (c) through (g) until all records have been read from all of the master file and the plurality of transaction files.

8. The apparatus of claim 6 wherein said step (e) of processing is performed by a specific program code portion executed by the processor, wherein the processor is to determine the specific program code portion based on which of the master file and the plurality of transaction files has a last-read key value equal to the current key value.

9. The apparatus of claim 8 wherein the specific program code portion is numerically identified using a series of bits, each bit associated with one of the master file and the plurality of transaction files, each bit having a first predetermined value if the current key value is equal to the last-read key value of the associated file, and a second predetermined value if the current key value is not equal to the last-read key value of the associated file.

10. The apparatus of claim 9 wherein the first predetermined value is one and the second predetermined value is zero.

11. A computer-readable medium having computer program code to cause a processor to process a master file having a plurality of records each identifiable by at least one key and a plurality of transaction files having at least one record each identifiable by at least one key to generate an updated master file by reading the records in the master file exactly once;

wherein the records in the master file and each of the transaction files are sorted by its at least one key, wherein the processor is to generate the updated master file by performing the steps of:

(a) reading a record and its associated key value from the master file and each of the plurality of transaction files;

(b) storing a last-read key value associated with the master file and each of the plurality of transaction files based on the reading in step (a);

(c) determining a current key value as an optimum of the last-key values for all of the master file and plurality of transaction files;

(d) determining which of the master file and the plurality of transaction files has a last-read key value equal to the current key value;

(e) processing the last-read record from each of the master file and the plurality of transaction files whose last-read record from each of the master file and the plurality of transaction files whose last-read key value equals the current key value to generate a record in the updated master file;

(f) reading a record and its associated key, or an end-of-file indication, from each of the master file and the plurality of transaction files whose last-read key value equals the current key value;

(g) updating the last-read key value for each of the master file and the plurality of transaction files based on said reading in step (f); and (h) repeating steps (c) through (g) at least once.

12. The computer-readable medium of claim 11 wherein said act (h) comprises repeating steps (c) through (g) until all records have been read from all of the master file and the plurality of transaction files.

13. The computer-readable medium of claim 11 wherein said step (e) of processing is performed by a specific program code portion based on which of the master file and the plurality of transaction files has a last-read key value equal to the current key value.

14. The computer-readable medium of claim 13 wherein the specific program code portion is numerically identified using a series of bits, each bit associated with one of the master file and the plurality of transaction files, each bit having a first predetermined value if the current key value is equal to the last-read key value of the associated file, and a second predetermined value if the current key value is not equal to the last-read key value of the associated file.

15. The computer-readable medium of claim 14 wherein the first predetermined value is one and the second predetermined value is zero.

* * * * *

UNITED STATES PATENT AND TRADEMARK OFFICE
CERTIFICATE OF CORRECTION

PATENT NO. : 7,206,793 B2
APPLICATION NO. : 10/154446
DATED : April 17, 2007
INVENTOR(S) : Partha Sarathi Majumder It is certified that error appears in the above-identified patent and that said Letters Patent is hereby corrected as shown below:

<u>On the Title Page</u>

In column 2, line 3, under "OTHER PUBLICATIONS", delete "Proceddings" and substitute --Proceedings-- in its place.

Signed and Sealed this

Sixteenth Day of October, 2007

JON W. DUDAS
*Director of the United States Patent and Trademark Office*